Patented Dec. 22, 1931

1,837,709

UNITED STATES PATENT OFFICE

JOSEPH C. HECKMAN, OF AVALON, PENNSYLVANIA

METHOD OF MAKING PIGMENTS

No Drawing.   Application filed February 6, 1929. Serial No. 338,036.

My invention relates to a product in the nature of a pigment for use as a rouge in the polishing of plate glass or other glass, jewelry, etc., and as a pigment for the tinting of paints, rubber, or other materials.

The invention contemplates the utilization of oxide of iron in the making of the product hereinafter described and claimed.

As one source of the iron oxide, I may utilize a waste product such as the iron sludge from chemical plants which make aniline oil through the use of iron borings as a catalyst. The borings after they have been used in the aniline process are in the form of a sludge which is a magnetic oxide of iron which has been heretofore discarded as waste material. This material is particularly suitable for my purpose.

One object of my invention is to utilize a heretofore waste or discarded material in the making of a commercially valuable product.

Another object of my invention is to provide a pigment or a rouge of the character referred to which is of high quality and whose depth of coloring or tinting can be conveniently controlled or varied.

In the practice of my invention, I take an oxide of iron such as the iron sludge referred to and dissolve the same in sulphuric acid. The percentage of sulphuric acid is varied in order to secure various grades of completed product, these grades having various strength of coloring or tinting capacity. A given quantity of sulphuric acid will more completely dissolve the iron than a smaller quantity thereof and therefore produce a pigment having a stronger body. A sufficient quantity of water will be incorporated with the other ingredients to secure effective mixing thereof.

The brilliancy of the completed product may be enhanced to a desired degree by the use of a small percentage of dissolved salts of soda, such as sodium sulphate, sodium chloride, sodium carbonate or the like, in conjunction with the oxide of iron and the sulphuric acid, the said constituents being of course varied according to the brilliancy desired.

After the constituents have been thoroughly mixed together, the mixture is then dried, thus producing a sulphate of iron. Thereafter the mixture is removed from the kettle or vat in which it has been prepared and placed in a calcining furnace where it is roasted at about 1500° F. to produce an oxide of iron of the desired brilliant red color and strength.

After the roasting operation has been completed, the mixture is washed in water to remove therefrom those acid remnants which have not been driven off by the heat during the calcining operation, and the material is then dried and finely ground. Thereupon it is ready for use either as rouge or as a coloring pigment, as above-stated.

The iron sludge referred to will ordinarily contain 81% $Fe_2O_3$, while after calcination it may contain from 90% to 96% $Fe_2O_3$.

A suitable mixture, without the use of soda may comprise 1 ton oxide of iron or dry sludge.
1 ton of 60° sulphuric acid.
30 gallons of water.

Where a soda is to be incorporated in the mixture, such mixture may consist of 1 ton oxide of iron or dry sludge.
1 ton 60° sulphuric acid.
30 gallons of water.
20 to 200 lbs. of soda.

In preparing the latter mixture, the water and soda are placed with the iron and the sulphuric acid added whereupon the mixture is stirred until it becomes stiff. It is then ready to be dried and calcined as above-explained.

In the making of rouge the color is not important, and the soda may be omitted, but the product wherein the soda is included, may be employed either as a rouge or as a coloring agent. However, the soda is useful in the making of rouge as above described, for the reason that it permeates and opens up the iron content thus producing a softer body and one of greater tinting and polishing strength. Furthermore, such action of the soda increases the brilliancy of the color of the product.

As heretofore indicated, the proportions of the various ingredients may be altered to a considerable extent without departing from the spirit and scope of the invention as defined in the accompanying claims.

While the invention is hereinafter referred to as a pigment, I employ the word "pigment" in a broad sense, and not as limited to simply a coloring or tinting agent.

I claim as my invention:—

1. The method which comprises treating an iron sludge with sulphur acid and sodium chloride to produce a sulphate of iron, calcining the resulting product to produce a ferric oxide and thereafter pulverizing the resulting oxide.

2. The method which comprises mixing water and sodium chloride with an oxide of iron, subjecting said mixture to the action of sulphuric acid, and thereafter calcining the product to produce a ferric oxide of brilliant red color.

3. The method which comprises treating a magnetic iron oxide with sulphuric acid and sodium chloride to produce a sulphate of iron, and calcining the resultant product at a temperature which will produce a ferric oxide of a strong brilliant red color.

4. The method which comprises treating oxide of iron with sulphuric acid and sodium chloride, to produce a sulphate of iron, calcining the mixture at a temperature which will produce an oxide of iron of brilliant red color, washing the resulting product to remove acid remnants therefrom, and thereafter grinding the product.

5. The method which comprises treating oxide of iron with sulphuric acid in the presence of a compound selected from the group consisting of sodium sulphate, sodium chloride and sodium carbonate, to produce a sulphate of iron, and thereafter calcining the resulting product at a temperature of approximately 1500° F. to produce a ferric oxide of brilliant red color.

In testimony whereof I, the said JOSEPH C. HECKMAN have hereunto set my hand.

JOSEPH C. HECKMAN.